United States Patent
Guizilini et al.

(10) Patent No.: US 11,615,544 B2
(45) Date of Patent: Mar. 28, 2023

(54) SYSTEMS AND METHODS FOR END-TO-END MAP BUILDING FROM A VIDEO SEQUENCE USING NEURAL CAMERA MODELS

(71) Applicant: TOYOTA RESEARCH INSTITUTE, INC., Los Altos, CA (US)

(72) Inventors: Vitor Guizilini, Santa Clara, CA (US); Igor Vasiljevic, Los Altos, CA (US); Rares A. Ambrus, San Francisco, CA (US); Sudeep Pillai, Los Altos, CA (US); Adrien Gaidon, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 139 days.

(21) Appl. No.: 17/021,978

(22) Filed: Sep. 15, 2020

(65) Prior Publication Data

US 2022/0084232 A1    Mar. 17, 2022

(51) Int. Cl.
*G06T 7/55* (2017.01)
*G06T 7/70* (2017.01)
(Continued)

(52) U.S. Cl.
CPC ............ *G06T 7/55* (2017.01); *G01C 21/3837* (2020.08); *G06T 7/70* (2017.01); *G05D 1/0088* (2013.01); *G05D 1/0214* (2013.01); *G05D 1/0223* (2013.01); *G05D 1/0251* (2013.01); *G05D 1/0278* (2013.01); *G05D 2201/0213* (2013.01); *G06T 2207/10016* (2013.01);
(Continued)

(58) Field of Classification Search
None
See application file for complete search history.

(56) References Cited

U.S. PATENT DOCUMENTS 7,860,301 B2   12/2010  Se
8,488,870 B2    7/2013  Martinez-Bauza
(Continued)

FOREIGN PATENT DOCUMENTS

AU    2017209231 A    1/2017
CN     108960036 A    12/2018
(Continued)

OTHER PUBLICATIONS

You, Y. et al., (2020). Semantic Correspondence via 2D-3D-2D Cycle. ArXiv, abs/2004.09061.
(Continued)

*Primary Examiner* — Delomia L Gilliard
(74) *Attorney, Agent, or Firm* — Sheppard, Mullin, Richter & Hampton LLP; Hector A. Agdeppa; Daniel N. Yannuzzi

(57) ABSTRACT

Systems and methods for map construction using a video sequence captured on a camera of a vehicle in an environment, comprising: receiving a video sequence from the camera, the video sequence including a plurality of image frames capturing a scene of the environment of the vehicle; using a neural camera model to predict a depth map and a ray surface for the plurality of image frames in the received video sequence; and constructing a map of the scene of the environment based on image data captured in the plurality of frames and depth information in the predicted depth maps.

24 Claims, 7 Drawing Sheets

(51) Int. Cl.
*G01C 21/00* (2006.01)
*G05D 1/02* (2020.01)
*G05D 1/00* (2006.01)

(52) U.S. Cl.
CPC .............. *G06T 2207/10024* (2013.01); *G06T 2207/20081* (2013.01); *G06T 2207/30244* (2013.01); *G06T 2207/30252* (2013.01)

(56) References Cited

U.S. PATENT DOCUMENTS

| | | |
|---|---|---|
| 8,564,657 B2 | 10/2013 | Michalke |
| 8,711,206 B2 | 4/2014 | Newcombe |
| 9,189,886 B2 | 11/2015 | Black |
| 9,665,100 B2 | 5/2017 | Shashua |
| 9,767,598 B2 | 9/2017 | Winder |
| 10,097,810 B2 | 10/2018 | Schwarz |
| 10,598,489 B2 | 3/2020 | Zhang |
| 10,600,210 B1 | 3/2020 | Citraro |
| 10,769,848 B1 | 9/2020 | Wang |
| 11,138,751 B2 | 10/2021 | Guizilini |
| 11,321,937 B1* | 5/2022 | Jiang .................. G06T 7/136 |
| 2015/0287211 A1 | 10/2015 | Mundhenk |
| 2015/0325003 A1 | 11/2015 | Cleveland |
| 2016/0267678 A1 | 9/2016 | Cleveland |
| 2017/0161901 A1 | 6/2017 | Cansizoglu |
| 2017/0316578 A1 | 11/2017 | Fua |
| 2019/0005718 A1* | 1/2019 | Zhou .................. G06T 7/55 |
| 2019/0108651 A1 | 4/2019 | Gu |
| 2019/0114824 A1 | 4/2019 | Martinez |
| 2019/0130639 A1 | 5/2019 | Boyce |
| 2019/0208181 A1 | 7/2019 | Rowell |
| 2019/0258251 A1 | 8/2019 | Ditty |
| 2019/0279383 A1* | 9/2019 | Angelova ............. G06N 3/08 |
| 2019/0286153 A1 | 9/2019 | Rankawat |
| 2020/0050900 A1 | 2/2020 | Schulter |
| 2020/0160546 A1* | 5/2020 | Gu ..................... G06T 3/0093 |
| 2020/0211206 A1* | 7/2020 | Wang .................. G06N 3/08 |
| 2020/0258249 A1* | 8/2020 | Angelova ............. G06T 7/20 |
| 2021/0004646 A1 | 1/2021 | Guizilini |
| 2021/0004976 A1 | 1/2021 | Guizilini |
| 2021/0027493 A1* | 1/2021 | Citraro ............... G06N 3/0454 |
| 2021/0065391 A1* | 3/2021 | Tran .................. G06T 7/80 |
| 2021/0118161 A1* | 4/2021 | Stein .................. G06V 10/82 |
| 2021/0150203 A1* | 5/2021 | Liu .................... G06V 30/422 |
| 2021/0225034 A1* | 7/2021 | Citraro ............... G06V 20/46 |
| 2021/0315485 A1 | 10/2021 | Matusik |
| 2021/0326601 A1 | 10/2021 | Tang |

FOREIGN PATENT DOCUMENTS

| | | |
|---|---|---|
| CN | 109784333 A | 5/2019 |
| CN | 110598556 A | 12/2019 |
| CN | 111325794 A | 6/2020 |
| DE | 102016123149 A | 5/2018 |
| EP | 3719747 A1 | 10/2020 |
| EP | 3770811 A1 | 1/2021 |
| WO | 2012091814 A2 | 7/2012 |
| WO | 2015035462 A | 3/2015 |
| WO | 2015035462 A1 | 3/2015 |
| WO | 2015113608 A | 8/2015 |
| WO | 2018140332 A1 | 8/2018 |
| WO | 2019010147 A1 | 1/2019 |
| WO | 2019094094 A1 | 5/2019 |
| WO | 2020029758 A1 | 2/2020 |
| WO | 2020035661 A1 | 2/2020 |

OTHER PUBLICATIONS

Henriques, João F., Mapping environments with deep networks (http://www.robots.ox.ac.uk/~vgg/blog/mapping-environmentswith-deep-networks.html) Jul. 6, 2018.
Roberts, Richard et al., Learning general optical flow subspaces for egomotion estimation and detection of motion anomalies (https://www.cc.gatech.edu/~dellaert/pubs/Roberts09cvpr.pdf), Apr. 21, 2020.
Teichman, Alex et al., Unsupervised intrinsic calibration of depth sensors via SLAM.
Facil, Jose M. et al., CAM-Convs: Camera-Aware Multi-Scale Convolutions for Single-View Depth (https://arxiv.org/pdf/1904.02028.pdf).
Salahuddin, Sumayyea et al., Object categorization using Cartesian Genetic Programming (CGP) and CGP-Evolved Artificial Neural Network (https://ieeexplore.ieee.org/document/5735073), Mar. 17, 2011.
Tang, Jiexiong et al., Self-Supervised 3D Keypoint Learning for Ego-motion Estimation, https://arxiv.org/pdf/1912.03426.pdf, Dec. 7, 2019.
Notice of Allowance dated Oct. 20, 2021, in U.S. Appl. No. 17/021,940.
Zhou et al., "Unsupervised Learning of Depth and Ego-Motion from Video," 2017 IEEE Conference on Computer Vision and Pattern Recognition (CVPR), Jul. 25, 2017, 10 pages (https://doi.org/10.48550/arXiv.1704.07813).
Gordon et al., "Depth From Videos in the Wild: Unsupervised Monocular Depth Learning From Unknown Cameras," 2019 IEEE/CVF International Conference on Computer Vision (ICCV), Nov. 1, 2019, pp. 8977-8986 (https://doi.org/10.1109/ICCV.2019.00907).
Guizilini et al., "3D Packing for Self-Supervised Monocular Depth Estimation," Mar. 28, 2020, arXiv preprint arXiv:1905.02693v4 [cs.CV], 13 pages (https://doi.org/10.48550/arXiv.1905.02693).
Chen et al., "EnforceNet: Monocular Camera Localization in Large Scale Indoor Sparse LiDAR Point Cloud," Jul. 16, 2019, arXiv preprint arXiv: 1907.07160v1 [cs.CV], 11 pages (https://doi.org/10.48550/arXiv.1907.07160).
Pillai et al., "Superdepth: Self-Supervised, Super-Resolved Monocular Depth Estimation," submitted to 2019 International Conference on Robotics and Automation (ICRA), Oct. 3, 2018, arXiv:1810.01849v1 [cs.CV], 7 pages (https://doi.org/10.48550/arXiv.1810.01849).
Godard et al., "Digging into Self-Supervised Monocular Depth Estimation," 2019 IEEE/CVF International Conference on Computer Vision (ICCV), Oct. 30, 2019, pp. 3828-3838 (https://openaccess.thecvf.com/content_ICCV_2019/papers/Godard_Digging_Into_Self-Supervised_Monocular_Depth_Estimation_ICCV_2019_paper.pdf).
Godard et al., "Unsupervised Monocular Depth Estimation With Left-Right Consistency," 2017 IEEE Conference on Computer Vision and Pattern Recognition (CVPR), Jul. 25, 2017, pp. 270-279 (https://openaccess.thecvf.com/content_cvpr_2017/papers/Godard_Unsupervised_Monocular_Depth_CVPR_2017_paper.pdf).
Corrected Notice of Allowability dated Aug. 2, 2022, in U.S. Appl. No. 17/021,951.
Office Action dated Feb. 16, 2022, in U.S. Appl. No. 17/021,951.

* cited by examiner

SYSTEMS AND METHODS FOR END-TO-END MAP BUILDING FROM A VIDEO SEQUENCE USING NEURAL CAMERA MODELS

TECHNICAL FIELD

The present disclosure relates generally to map building, and in particular, some implementations may relate to systems and methods for map construction from a video sequence.

DESCRIPTION OF RELATED ART

Autonomous vehicle technology is becoming more commonplace with the introduction of new vehicles each model year. While widespread adoption of fully autonomous vehicles is only now becoming visible on the horizon, autonomous vehicle technology is gaining increasing popularity for assisted driving and other semi-autonomous vehicle operation. Developers within organizations such as major original equipment manufacturers, tier 1 suppliers, startup companies and others, are racing to develop autonomous vehicle and advanced driver assistance systems (ADAS) technologies. Such technologies are not limited to autonomous vehicles, but can also be used in robotics and other like applications.

Various devices that operate autonomously or that provide information about a surrounding environment use sensors that facilitate perceiving obstacles and additional aspects of the surrounding environment. For example, a robotic device may use information from the sensors to develop awareness of the surrounding environment in order to navigate through the environment and avoid hazards. In particular, the robotic device may use the perceived information to determine a 3-D structure of the environment in order to identify navigable regions. The ability to perceive distances through estimation of depth using sensor data may provide the robotic device with the ability to plan movements through the environment and generally improve situational awareness about the environment. However, depending on the available onboard sensors, the robotic device may acquire a limited perspective of the environment, and, thus, can encounter difficulties in distinguishing aspects of the environment.

In robotics and 3D computer vision, a camera model that relates image pixels and 3D world points is a prerequisite for many tasks, including visual odometry, depth estimation, and 3D object detection. The ability to reconstruct the structure of a scene with high-accuracy is fundamental to ensuring robust autonomous navigation.

BRIEF SUMMARY OF THE DISCLOSURE

Various embodiments of the disclosed technology relate to improved methods for map building using a neural camera model. Embodiments may be configured to use a neural camera model that is capable of learning a pixel-wise ray surface that enables learning depth and pose estimates in a self-supervised way from a wider variety of camera geometries (i.e. pinhole, fisheye and catadioptric). The neural camera model may be applied to the task of self-supervised map building. This can be accomplished, for example, by applying the neural camera model not only for accurate depth estimation for single images, but also to obtain consistent depth estimated across all images of a given video. Embodiments may further be configured to specifically link all the consistency constraints in the depth through the ray surface. By optimizing the ray surface along with the depth and pose networks, embodiments may estimate a map that is locally consistent across the whole video. Embodiments are presented technological improvement as they may be implemented to avoid a tedious map building process that relies on accurate data from or complex lidar sensors and accurate Eagle motion as mentation. Instead, embodiments may be implemented to allow creation of consistent metric maps in a self-supervised way without expensive sensors, using only RGB videos.

A method of map construction using a video sequence captured on a camera of a vehicle in an environment may include: receiving a video sequence from the camera, the video sequence including a plurality of image frames capturing a scene of the environment of the vehicle; using a neural camera model to predict a depth map and a ray surface for the plurality of image frames in the received video sequence; and constructing a map of the scene of the environment based on image data captured in the plurality of frames and depth information in the predicted depth maps.

A system for map construction using a video sequence captured on a camera of a vehicle in an environment, the system may include: a non-transitory memory configured to store instructions; a processor configured to execute the instructions to perform the operations of: receiving a video sequence from the camera, the video sequence including a plurality of image frames capturing a scene of the environment of the vehicle; using a neural camera model to predict a depth map and a ray surface for the plurality of image frames in the received video sequence; and constructing a map of the scene of the environment based on image data captured in the plurality of frames and depth information in the predicted depth maps.

Predicting the depth map may include performing the prediction under a constraint that predicted depths for corresponding pixels in the plurality of image frames are consistent across the plurality of image frames in the video sequence.

The method or operations may further include using the neural camera model to estimate ego motion between an first image frame and a second image frame to determine displacement relative to objects in the scene. In various embodiments, optimizing may further include using ego motion predicted between two frames to transfer depth information from the first image frame to the second image frame.

The method or operations may further include using the plurality of image frames to train the neural camera model at the same time the neural camera model is used to predict the depth map and ray surface for the plurality of image frames.

The method or operations may further include using a neural camera model to predict a pose of the camera.

In various embodiments, using a neural camera model to predict a depth map and a ray surface for the plurality of image frames in the received video sequence, may include passing each frame of the video sequence through the neural camera model individually to train the neural camera model and to provide depth and ray surface predictions for each image.

In various embodiments, predicting the ray surfaces may include performing the prediction under a constraint that predicted ray surfaces for corresponding pixels in the plurality of image frames are consistent across the plurality of image frames in the video sequence.

The video sequence may include a portion of an entire video file.

The method or operations may further include using the camera model to predict a depth map and a ray surface for the plurality of image frames for each of a plurality of different video sequences to train the neural camera model in dependently on each of the different video sequences.

In various embodiments, predicting is performed without a known or calibrated camera model for the camera.

In various embodiments, the neural camera model is configured to learn a pixel-wise ray surface that enables learning depth and pose estimates in a self-supervised way.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

The ability to reconstruct a highly accurate 3D map of a scene, and to localize within the map precisely, is fundamental to ensuring robust autonomous navigation. By directly measuring the 3D geometry information of the scene, LiDAR sensors are more commonly used, making it easier to accomplish tasks such as mapping and localization. However, cameras are preferable over the expensive and bulky LiDAR counterpart, because they are generally cheap and compact while providing richer semantic information about the environment. Cameras, however, are not easily swappable with LiDAR sensors as cameras typically do not provide the same level of information as LiDAR. Embodiments may be configured to use a set of camera images (e.g., RGB images) to iteratively estimate depth for each image, while taking into account camera motion (e.g., corresponding to ego vehicle motion) from one image to the next. Embodiments may use these quantities to construct a metric map of the environment.

Embodiments may be implemented using a neural camera model to predict a depth map and ray surfaces without requiring known, calibrated camera models and intrinsics to perform 2D-3D lifting to lift the depth from an image and project onto other images. Additionally, embodiments may be configured to estimate depth across multiple frames in a video captured from a single camera, which can avoid inconsistencies or errors that may arise in areas of the map observed by multiple cameras at different locations on the vehicle.

Embodiments may be configured to perform self-supervised map building using only RGB images to train neural networks to estimate required quantities such as depth, ego motion, lifting and projection functions.

The systems and methods disclosed herein may be implemented with any of a number of different autonomous or semi-autonomous vehicles and vehicle types. For example, the systems and methods disclosed herein may be used with cars, trucks, buses, construction vehicles and other on- and off-road vehicles. These can include vehicles for transportation of people/personnel, materials or other items. In addition, the technology disclosed herein may also extend to other vehicle types as well. An example Autonomous Vehicle (AV) in which embodiments of the disclosed technology may be implemented is illustrated in FIG. 1.

Figure 1:
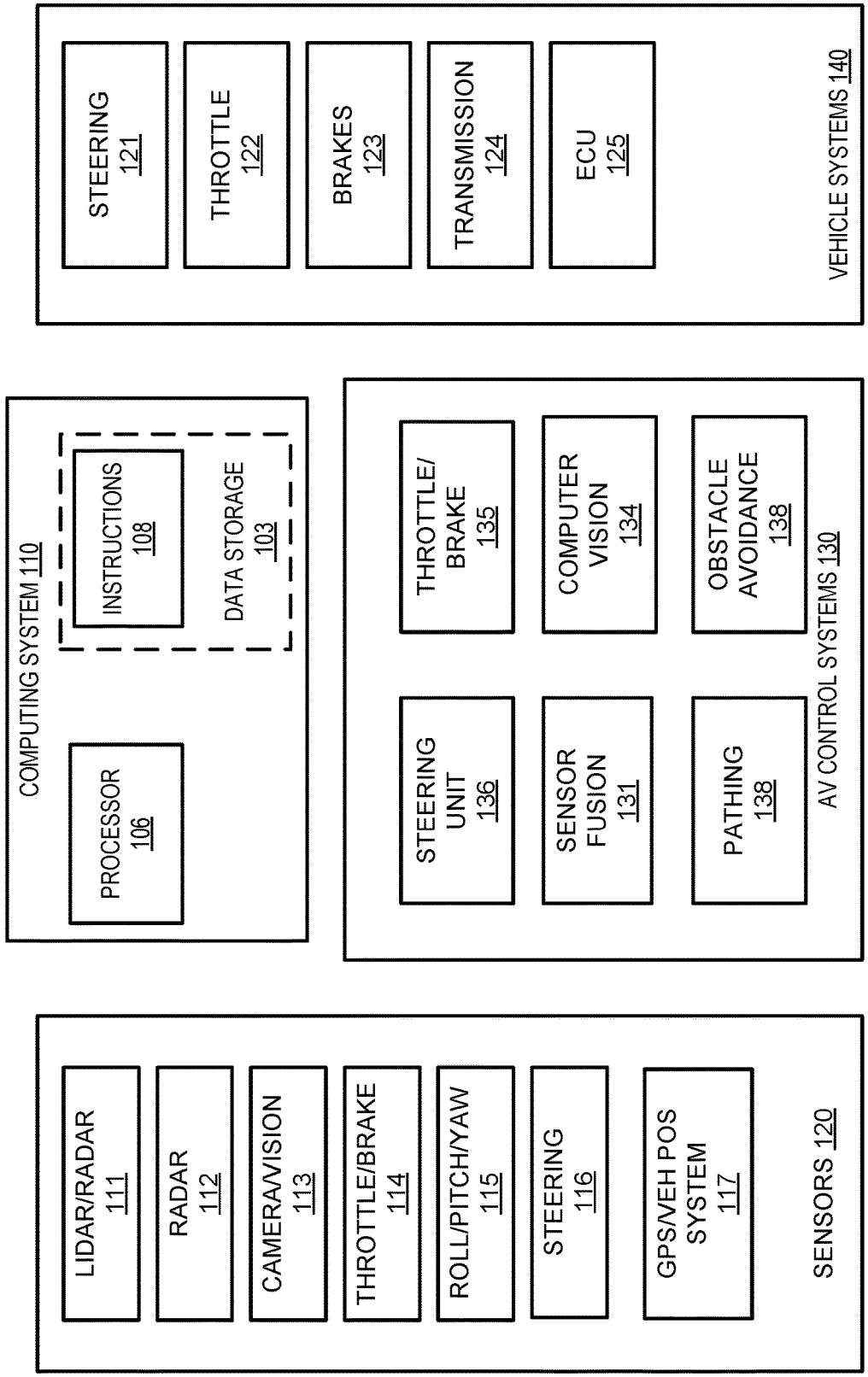
FIG. 1 illustrates an example autonomous or semi-autonomous vehicle with which embodiments of the disclosed technology may be implemented.

FIG. 1 illustrates an example autonomous or semi-autonomous vehicle with which embodiments of the disclosed technology may be implemented. In this example, vehicle 100 includes a computing system 110, sensors 120, AV control systems, 130 and vehicle systems 140. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include lidar 111, radar 112, or other like the distance measurement sensors, image sensors 113, throttle and brake sensors 114, 3D accelerometers 115, steering sensors 116, and a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as lidar 111, radar 112, IR sensors and other like sensors can be used to gather data to measure distances and closing rates to various external objects such as other vehicles, traffic signs, pedestrians, light poles and other objects. Image sensors 113 can include one or more cameras or other image sensors to capture images of the environment around the vehicle as well as internal to the vehicle. Information from image sensors 113 can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refined or verify vehicle location.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Although not illustrated, other sensors 120 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g, disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing module 138 to determine an appropriate path to avoid a detected obstacle.

Vehicle systems 140 may include a plurality of different systems/subsystems to control operation of vehicle 100. In this example, AV control systems 130 include steering system 121, throttle system 122, brakes 123, transmission went 24, electronic control unit (ECU) 125 and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
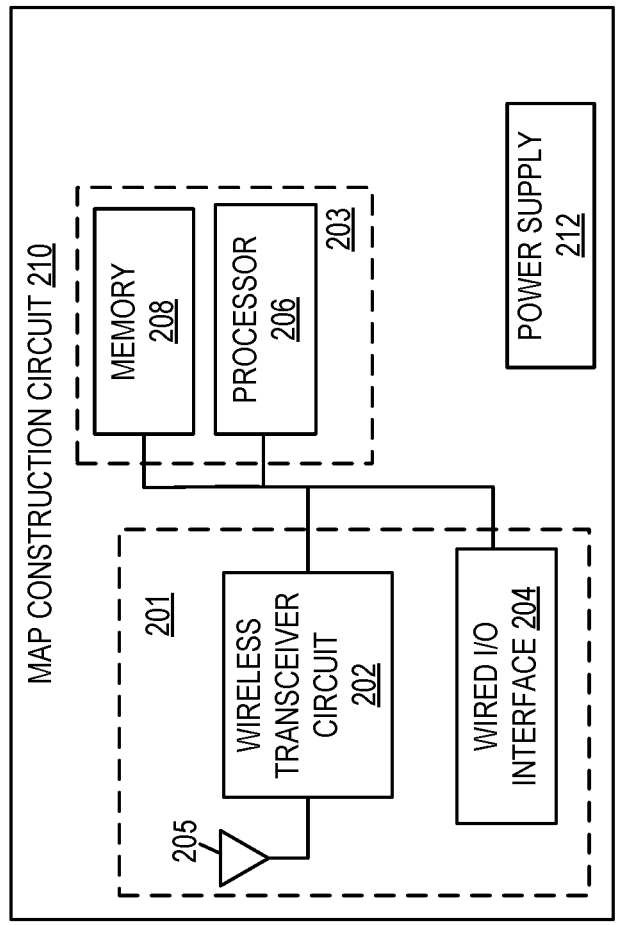
FIG. 2 is a diagram illustrating an example system for performing map construction by applying a neural camera model to a video sequence in accordance with various embodiments.
Figure 2:

FIG. 2 is a diagram illustrating an example system for performing map construction by applying a neural camera model to a video sequence of a scene in accordance with various embodiments. This example includes a map construction circuit 210 and one or more cameras 232 mounted to a subject vehicle to capture video sequences. Cameras 232 may include, for example, visible light cameras, infrared cameras, thermal cameras, ultrasound cameras, and other cameras configured to capture video sequences and producing an array of pixels or other image elements for the frames of the video sequences.

Map construction circuit 210 in this example includes a communication circuit 201, a decision circuit 203 (including a processor 206 and memory 208 in this example) and a power supply 212. Components of map construction circuit 210 are illustrated as communicating with each other via a data bus, although other communication in interfaces can be included.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to map construction circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a map construction circuit 210.

Communication circuit 201 either or both a wireless transceiver circuit 202 with an associated antenna 214 and a wired I/O interface 204 with an associated hardwired data port (not illustrated). As this example illustrates, communications with map construction circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by map construction circuit 210 to/from other entities such as one or more cameras 232 and other vehicle sensors and systems as may be appropriate.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

In a self-supervised monocular structure-from-motion setting, a neural camera model may be configured to learn: (a) a depth model fd: I→D, that predicts a depth value d^=fd(I (p)) for every pixel p=[u, v]$^T$ in the target image I$_t$ (up to a scale factor); and (b) an ego-motion model f$_x$: (I$_t$, IC)→X$_{t→C}$, that predicts the rigid transformations for all c ∈ C given by $$X_{t \to c} = \begin{pmatrix} Rt \\ 0 1 \end{pmatrix} \in SE(3),$$

between the target image I$_t$ and a set of context images I$_c$ ∈ I$_C$, taken as adjacent frames in a video sequence.

Embodiments may be configured to train depth and pose networks simultaneously in a self-supervised manner. This may be achieved by projecting pixels from a context image I$_c$ onto a target image I$_t$, and minimizing the photometric reprojection error between original target image, I$_t$ and synthesized Î$_t$ images.

Figure 3:
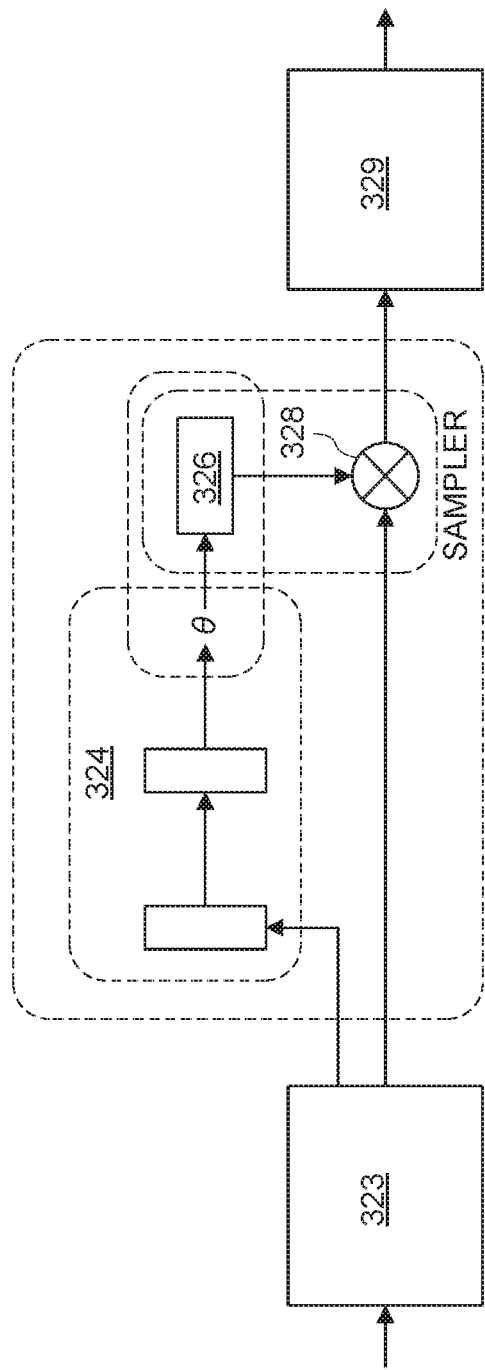
FIG. 3 illustrates an example architecture of a spatial transformer module in accordance with various embodiments.

The image synthesis operation in various embodiments may be performed using Spatial Transformer Networks (STNS) via grid sampling with bilinear interpolation, and may thus be fully differentiable. FIG. 3 illustrates an example architecture of a spatial transformer module in accordance with various embodiments. In this example, an input feature map 323 is provided to a localization network 324. Localization network 324 may be configured to regress the transformation parameters θ. The regular spatial grid may be transformed to a sampling grid 326. Sampling grid 326 may be applied to the input feature map via sampler 328 to produce warped output feature map 329. The combination of the localization network 324 and sampling mechanism (e.g., sampler 320) defines the example spatial transformer depicted in this embodiment.

In various embodiments, the pixel-wise warping may take the form of:

$$\hat{p}_t = \pi_c(R_{t \to c} \phi_t(p_t, d_t) + t_{t \to c}) \quad (1)$$

where $\phi(p, d) = P$ is responsible for 2D-to-3D conversion by lifting an image pixel in homogeneous coordinates $p=[u, v, 1]^T$ to a 3D point $P=[x, y, z]^T$ based on its depth value d. Conversely, $\pi(P)=p$ projects a 3D point back onto the image plane as a pixel. For the standard pinhole camera model, used in many conventional learning-based monocular depth estimation algorithms, these functions have a closed-form solution and can be calculated as:

$$\phi(p, d) = dK^{-1}p = d \begin{bmatrix} f_x & 0 & c_x \\ 0 & f_y & c_y \\ 0 & 0 & 1 \end{bmatrix}^{-1} [u \; v \; 1]^T \quad (2)$$

$$\pi(P) = \frac{1}{P_z}KP = \frac{1}{z}\begin{bmatrix} f_x & 0 & c_x \\ 0 & f_y & c_y \\ 0 & 0 & 1 \end{bmatrix} [u \; v \; z]^T, \quad (3)$$

with intrinsics matrix K, focal length ($f_x$, $f_y$) and principal point ($c_x$, $c_y$). These parameters are usually assumed to be known, obtained using prior independent calibration techniques, or are learned as additional variables during the training stage.

The self-supervised objective loss to be minimized is of the form:

$$\mathcal{L}(I_t, \hat{I}_t) = \mathcal{L}_p(I_t, I_C) + \lambda_d \mathcal{L}_d(\hat{D}_t), \quad (4)$$

which is the combination of an appearance-based loss $\mathcal{L}_p$ and a weighted depth smoothness loss $\mathcal{L}_d$, described below in more detail. This loss is then averaged per pixel and batch during training to produce the final value to be minimized. For simplicity, embodiments may be implemented that do not explicitly model dynamic objects (which break the static scene assumption), although these could be easily incorporated into various embodiments framework to further improve experimental results.

A camera model may be defined by two operations: the lifting of 3D points from 2D image pixels, i.e., $\phi(p, d)=P$; and the projection of 3D points onto the image plane, i.e., $\pi(P)=p$. A standard pinhole perspective model provides closed-form solutions to these two operations, as matrix-vector products using the closed-form solution (Equations 2-3, above). Typical camera models include a ray surface that associates each pixel with a corresponding direction, offering a generic association between 3D points and image pixels. However, although lifting is simple and can be computed in closed form, the projection operation has no closed-form solution and is non-differentiable, which makes such models unsuitable for learning-based applications.

Figure 4:
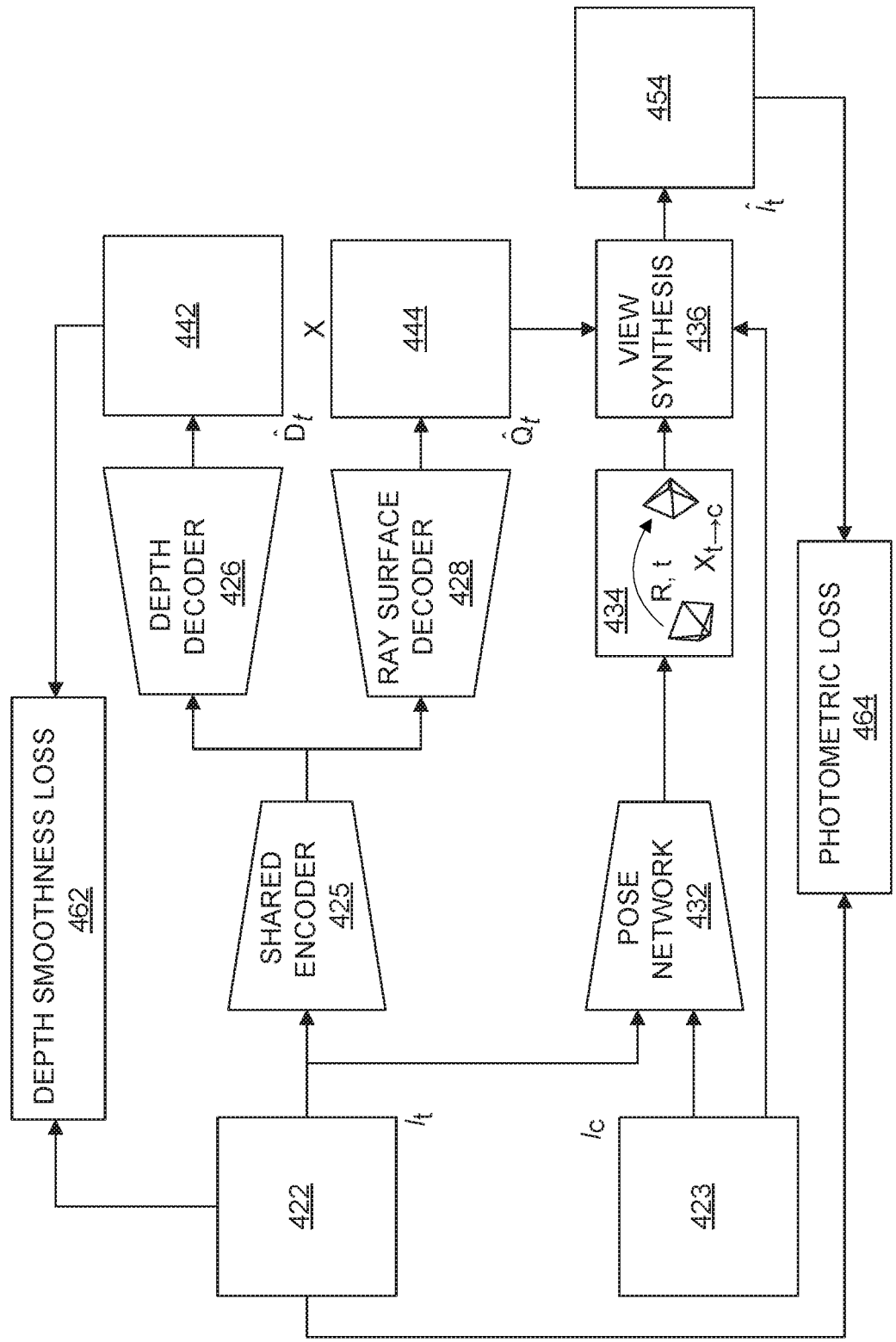
FIG. 4 illustrates an example of a training architecture in accordance with various embodiments.

Accordingly, embodiments may use a neural camera model that is differentiable, and thus amenable to end-to-end learning in a self-supervised monocular setting. FIG. 4 illustrates an example of a training architecture in accordance with various embodiments. This example provides a self-supervised monocular depth pose and ray surface estimation architecture in accordance with various embodiments. This example operates on multiple images, a target image 422 and a context image 423. Target image 422 is provided to a shared encoder 425.

In various embodiments, for each pixel $p=[u, v]^T$, a corresponding camera center S(u, v) may be introduced as a 3D point and a unitary ray surface vector $Q(u, v) \in \mathbb{R}^3$, with D(u, v) representing the scene depth along the ray. Note that, for central cameras, the camera center is the same for all points, so that S(u, v)=S, $\forall$(u, v).

The shared encoder 425 may be configured to accept an image as input, and map it to a feature space that encodes both high-level image properties such as structure, as well as artefacts that may be due to the camera configuration, such as various distortions. These features are then "decoded" in depth decoder 426 and ray surface decoder 428 to yield the per pixel depth and per pixel ray surface.

Embodiments include a depth decoder 426, which may be implemented to provide a predicted depth map 442 for the target image. Embodiments may also include a ray surface decoder 428 that predicts a $Q^*=f_r(I)$ to produce a predicted ray surface estimate 444 in the form of, $f_r$: I→Q.

As shown in the example of FIG. 4, embodiments may be configured to train the depth and pose networks simultaneously in a self-supervised manner. Accordingly, target image 422 and context image 423 are provided to train a pose network 432. Training the depth and pose networks simultaneously in a self-supervised manner may be achieved by projecting pixels from the context image $I_c$ onto the target image $I_t$, and minimizing the photometric reprojection error between original $I_t$ and synthesized $\hat{I}_t$ images.

Embodiments may be implemented to accommodate appearance-based loss. the similarity between target It and warped $\hat{I}_t$ images may be estimated in some embodiments at the pixel level using Structural Similarity (SSIM) combined with an L1 loss term:

$$\mathcal{L}_p(I_t, \hat{I}_t) = \alpha \frac{1 - SSIM(I_t, \hat{I}_t)}{2} + (1 - \alpha)\|I_t, \hat{I}_t\|$$

In order to increase robustness against parallax or the presence of dynamic objects, embodiments may be implemented to consider only the minimum pixel-wise photometric loss value for each context image in $I_C$. The intuition is that the same pixel will not be occluded or out-of-bounds in all context images, and its association with minimal photometric loss should be correct. Similarly, embodiments may mask out static pixels by removing those with a warped photometric loss $\mathcal{L}_p(I_t, \hat{I}_t)$ higher than their original photometric loss $\mathcal{L}_p(I_t, I_c)$.

Embodiments may compute a depth smoothness loss 462 operating on the predicted depth map 442 and the target image 422. To regularize the depth in textureless image regions, embodiments may incorporate an edge-aware term that penalizes high depth gradients in areas with low color gradients:

$$\mathcal{L}_s(\hat{D}_t) = |\delta_x \hat{D}_t| e^{-|\delta_x I_t|} + |\delta_y \hat{D}_t| e^{-|\delta_y I_t|}, \quad (6)$$

Given the above definitions, for any pixel p its corresponding 3D point P can be obtained as follows:

$$P(u,v) = S(u,v) + \hat{D}(u,v)\hat{Q}(u,v) \quad (7)$$

In other words, embodiments may scale the predicted ray vector ^Q(u, v) by the predicted depth ^D(u, v) and offset it by the camera center S(u, v), which is the same for all pixels in a central camera. However, because embodiments may operate in a purely self-supervised monocular learning-based setting, the resulting depth and pose estimates are in some embodiments generated only up to a scale factor. This means that, for simplicity and without loss of generality, the system can assume that the camera center coincidences with the origin of the reference coordinate system and set $S(u, v) = [0, 0, 0]^T \forall u, v \in I$.

Consider $P_t = \{P_j\}H_j = 1W$, produced by lifting pixels from $I_t$ as 3D points. In the standard pinhole camera model, projection is a simple matrix-vector product (Equation 3). For embodiments of the neural camera model, however, for each 3D point $P_j$ the process identifies the corresponding pixel $p_i \in I_c$ with ray surface vector $\hat{Q}_i = \hat{Q}_c(p_i)$ that most closely matches the direction of Pj to the camera center $S_c$ (see FIG. 3b). Call this direction $r_c \rightarrow j = P_j - S_c$. Thus, the process finds $p^*_i$ such that:

$$p^*_i = \underset{p_i \in I_c}{\mathrm{argmax}} \langle \hat{Q}_c(p_i), r_{c \rightarrow j} \rangle \quad (8)$$

Solving this problem may include searching over the entire ray surface $\hat{Q}_c$ and can be computationally expensive: a camera producing images of resolution H×W would require a total of $(HW)^2$ evaluations, as each 3D point from Pt can be associated with any pixel from the context image, $I_c$. Additionally, the argmax (the elements of the domain of the function at which the function values are maximized) operation is non-differentiable, which precludes its use in an end-to-end learning-based setting. Example solutions to each of these issues are presented below, which in conjunction enable the simultaneous learning of depth, pose and our proposed neural camera model in a fully self-supervised monocular setting.

To project the 3D points Pt onto context image $I_c$, embodiments may find for each $P_j \in$ Pt the corresponding pixel pi $\in I_c$ with surface ray ^Qi closest to the direction rc,j=Pj−$S_c$. Taking the dot product of each direction $r_{c \rightarrow j}$ with each ray vector ^Qi, we obtain a (H×W)² tensor M where each coefficient Mij=(^Qi, $r_{c \rightarrow j}$)=M(pi, Pj) represents the similarity between ^Qi and $r_{c \rightarrow j}$. With this notation, projection for a neural camera model may be given by selecting the i* index for each Pj with:

$$i^* = \underset{i}{\mathrm{argmin}} M(p_i, P_j) \quad (9)$$

To make this projection operation differentiable, embodiments may substitute argmax with a softmax with temperature τ, thus obtaining a new tensor M~ defined as:

$$\tilde{M}(p_i, P_j) = \frac{\exp(M(p_i, P_j)/\tau)}{\left(\sum_i \exp(M(p_i, P_j)/\tau)\right)} \quad (10)$$

Softmax is a function that takes an vector of N real numbers, and normalizes it into a probability distribution of N probabilities proportional to the exponentials of the input numbers.

Embodiments may anneal the temperature over time so that the tensor becomes approximately one-hot for each pixel. The 2D-3D association used for projection may be obtained by multiplying with a vector of pixel indices. Thus, projection can now be implemented in a fully differentiable way using STNs.

Figure 5:
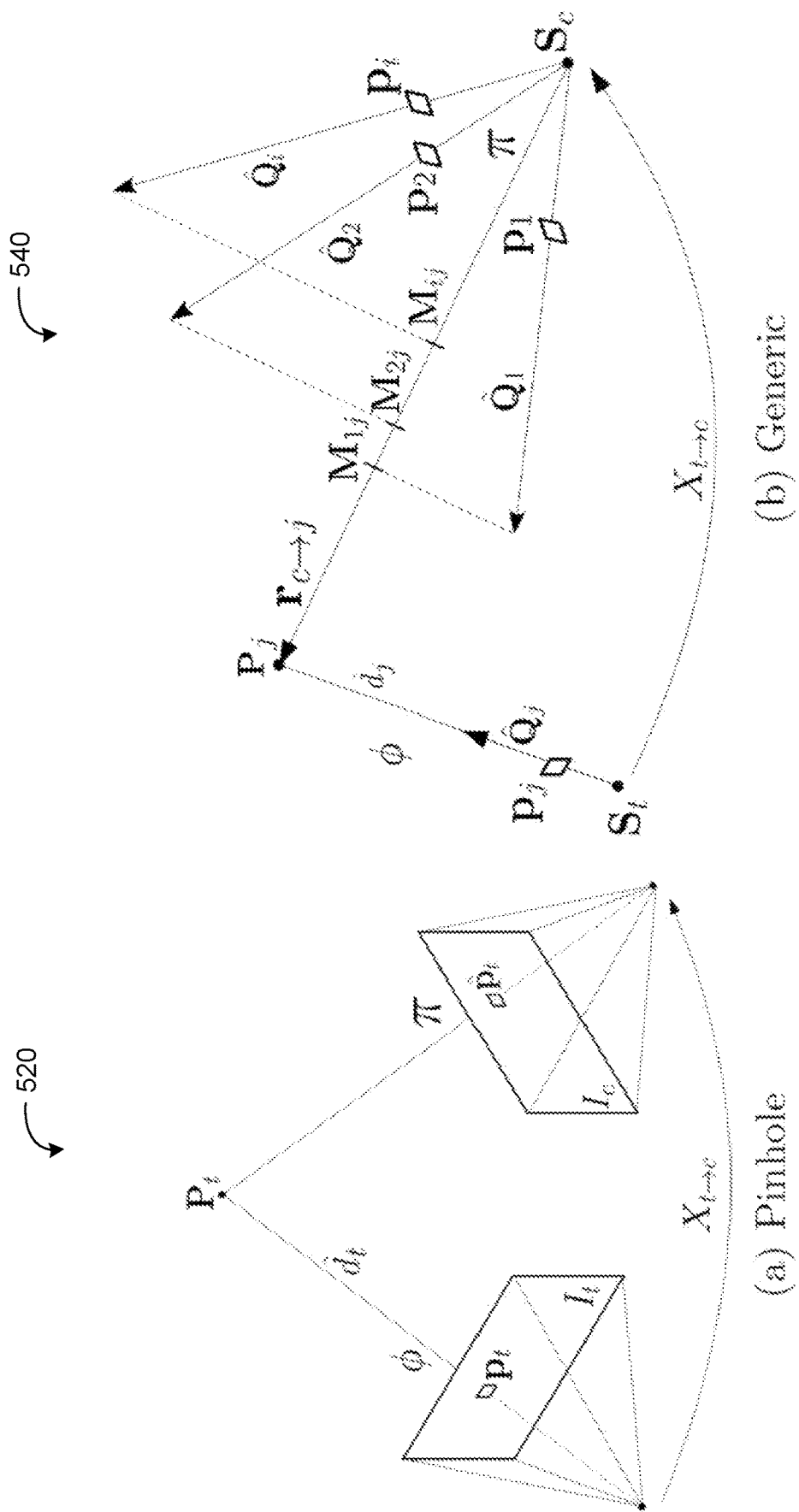
FIG. 5 is a diagram illustrating an example comparison of lifting and projection operations between the standard pinhole and various embodiments of the neural camera model.

FIG. 5 is a diagram illustrating an example comparison of lifting and projection operations between the standard pinhole and various embodiments of the neural camera model. The standard pinhole model is shown at 520 and shows the rigid transformation Xt→c. The example at 540 shows embodiments of the neural camera model, for a single pixel $p_j$ considering target $I_t$ and context $I_c$ images. Straight arrows in the example at 540 represent unitary ray surface vectors Q(p), drawn out of scale to facilitate visualization. In this example, p1 is associated to pj, because it satisfies Equation 9.

In the structure-from-motion setting, learning a randomly initialized ray surface is similar to learning 3D scene flow, which is typically a challenging problem when no calibration is available, particularly when considering self-supervision. To avoid this random initialization, embodiments may be configured to learn instead a residual ray surface $\hat{Q}_r$, that is added to a fixed ray surface template $Q_0$ to produce $Q^{\hat{}} = Q_0 + \lambda_r \hat{Q}_r$. The introduction of such template allows the injection of geometric priors into the learning framework, because if some form of camera calibration is known—even if only an approximation—the system can generate its corresponding ray surface, and use this as a starting point for further refinement using the learned ray surface residual.

If no such information is available, embodiments may be configured to initialize a "dummy" template based on a pinhole camera model, obtained by lifting a plane at a fixed distance (Equation 2) and normalizing its surface. For stability, embodiments may be configured to start training only with the template $Q_0$ and gradually introducing the residual $\hat{Q}_r$, by increasing the value of $\lambda_r$. Interestingly, this pinhole prior significantly improves training stability and convergence speed even in a decidedly non-pinhole setting (i.e., catadioptric cameras).

In a generalized version of the neural camera model, rays at each pixel are independent and can point in completely different directions. Because of that, Equation 9 requires searching over the entire image. This may quickly become computationally infeasible at training time even for lower resolution images, both in terms of speed and memory footprint. To alleviate such heavy requirements, embodiments may be configured to restrict the optimal projection search (Equation 10) to a small h×w grid in the context image $I_c$ surrounding the (u, v) coordinates of the target pixel $p_t$. The motivation is that, in most cases, camera motion will be small enough to produce correct associations within this neighborhood, especially when using the residual ray surface template described above. To further reduce memory requirements, the search may be performed on the predicted ray surface at half-resolution, which is then upsampled using bilinear interpolation to produce pixel-wise estimates. At test-time none of these approximations are necessary, and we can predict a full-resolution ray surface directly from the input image.

The neural camera model (e.g., as described above with reference to FIGS. 3-5), can be used to predict the depth map and ray surface for the images. Embodiments may be implemented to extend the neural camera model to an entire video sequence to learn distortion and alignment depths across the multiple frames of images within the video sequence. Accordingly, embodiments may optimize the neural camera model by evaluating the predicted depths from all of the frames in the video sequence (which may be an entire video or a subset of an entire video) and ensuring that the depths for corresponding pixels are consistent across all frames in the video sequence to produce a consistent map. Embodiments may be configured to learn from all frames in the video sequence at the same time.

In embodiments, the system may train the depth network, ray surface network, and pose network to predict depth, pose and ray surface vectors (e.g., to train a complete camera model). With these factors, the system can construct a map that combines all three factors. Depth corresponds to the depth of the pixels or the z-dimension, pose is the position of the camera, which is typically fixed with respect to the ego vehicle, and the ray surface allows the system to lift the depth map plus the image information to 3D.

Particularly, some implementations may use a first image to predict the depth and ray surface of the pixels for that image, and also predict the depth and ray surface of the pixels for a second image. Enforcing a constraint that the depths should be the same across the images and the ray surfaces should be the same because it is the same camera, the system can use this information to construct a map.

Figure 6:
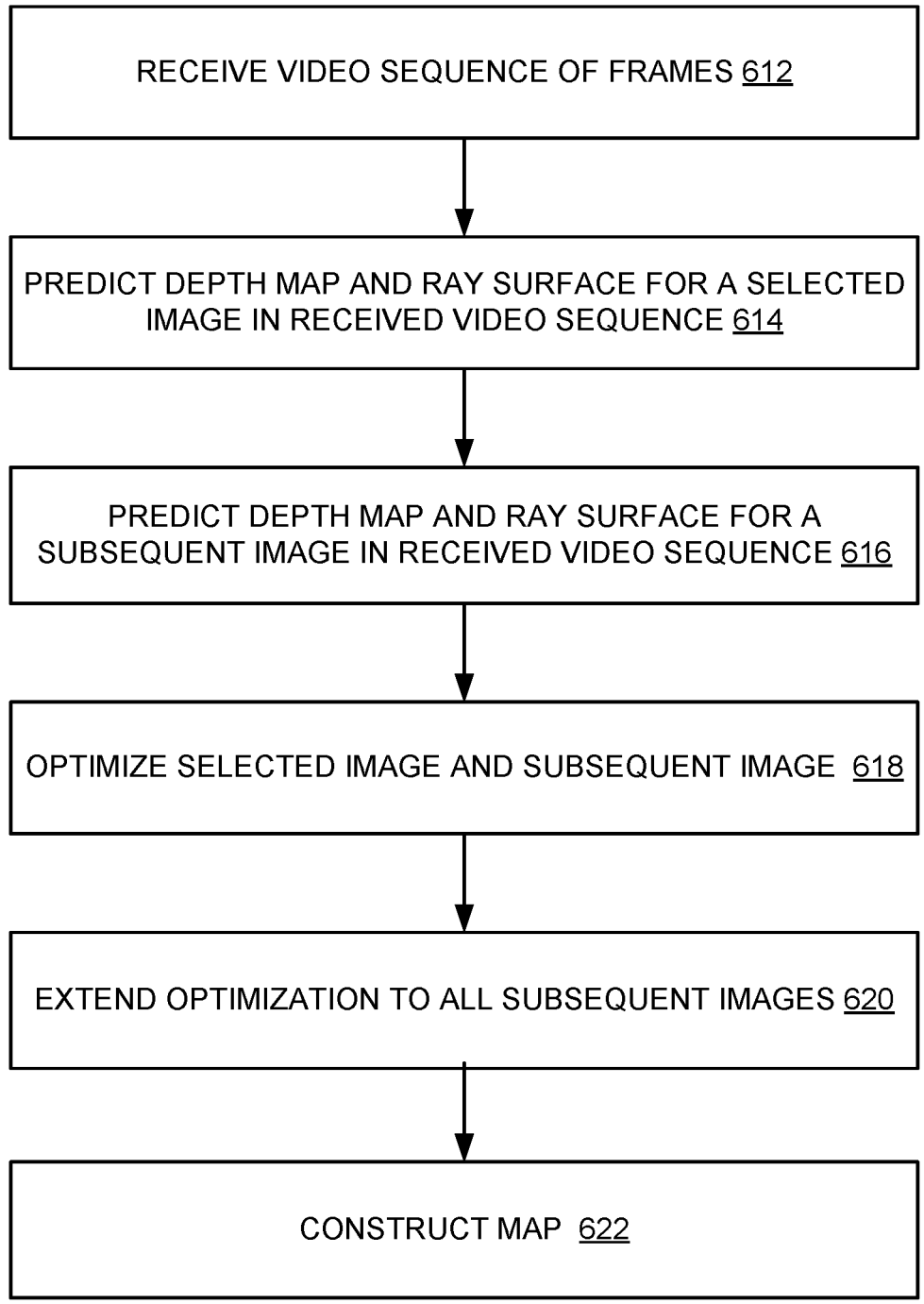
FIG. 6 is a diagram illustrating an example process for constructing a map using a neural camera model in accordance with various embodiments.

FIG. 6 is a diagram illustrating an example process for constructing a map using a neural camera model in accordance with various embodiments. At operation 612, the system receives a video sequence of frames. A video sequence may typically include a plurality of video frames shot in sequence, and may be captured from a moving vehicle. The video sequence may encompass a scene of an environment proximate or surrounding the vehicle. Where the video sequence is captured from a moving vehicle, embodiments may consider ego motion as part of the map construction process. The video sequence can be a portion of an entire video file, but should include enough frames to allow adequate construction of the map.

At operation 614, an initial frame in the video sequence is applied to a neural camera model such as, for example, the neural camera model described above with reference to FIGS. 3-5. The initial frame may be the first image frame in the video sequence. In this operation, the initial frame of image data can be used to both train the neural camera model as well as to allow the neural camera model to predict the depth map of the frame, ray surface for 2D-3D lifting, and pose of the camera. The initial frame in the video sequence may be, but need not be, the first frame of the video sequence.

At operation 616, a subsequent image frame in the video sequence is applied to the neural camera model. As with operation 614, the subsequent frame can be used to both train the neural camera model as well as to allow the neural camera model to predict the depth map of the subsequent frame, the ray surface for 2D-3D lifting, and pose of the camera.

The system may also be configured to run sets of images (e.g., pairs of images at times t and t+1) through the post estimation network of the neural camera model to predict ego motion or displacement. Accordingly, in some embodiments, the system estimates ego motion between the initial frame and the subsequent frame to determine displacement relative to objects in the scene. The ego motion predicted between two frames can be used to transfer the depth information from an initial frame to a subsequent frame.

At operation 618, the system optimizes the neural camera model by adding a constraint that the depths must be consistent across all of the frames in the video sequence to arrive at a consistent map. In other words, the system can operate on the constraint that there should be consistency of depth where portions of the frame overlap while taking into account displacement caused by ego motion.

In addition to consistency of depth, the system may include additional constraints such as, for example, a constraint that there should also be consistency of ray surface predictions across the frame. Because embodiments use video sequence captured from a single camera, the system may correctly operate under the assumption that the pose is the same across each of the frames. However, to the extent that pose may change, such changes may be tracked and used in conjunction with ego motion to refine the displacement calculation.

Embodiments may perform these operations for every frame in the video sequence to train the neural camera model over the entire sequence and to use the predicted information to construct the map. The system may impose the same constraints across all the frames and optimize over the depth of all frames in the video. This helps to ensure a consistent result.

At operation 620, the system performs training, prediction and optimization across all frames of the video sequence. Embodiments may run each frame of the video sequence individually through the neural camera model to continue to train the neural camera model and to provide depth and ray surface predictions for each image.

At operation 622, the system constructs a map based on the captured image and depth information. For example, the system can determine the position of an object based on a position of the object in the frame (e.g., as represented by one or more pixels) and the predicted depth for that object. This information can be used to construct a map.

Training on a particular video sequence may allow the system to optimize the neural camera model for that particular video sequence. This can lead to superior results when using the neural camera model to predict depth and ray surfaces and use that information to construct a map. Implementations may also train other video sequences to optimize the neural camera model for each of the other particular video sequence.

Embodiments may be implemented to use two different networks for depth and camera intrinsic parameters, thus decoupling depth and intrinsics learning so they can produce specific features focused at each task. Moreover, embodiments may optimize a single intrinsic (e.g., the ray surface model) for each training video sequence. This may be implemented to allow the system to link all depth consistency constraints to one quantity. By optimizing the ray surface model, the system may optimize alignment over the entire map.

Figure 7:
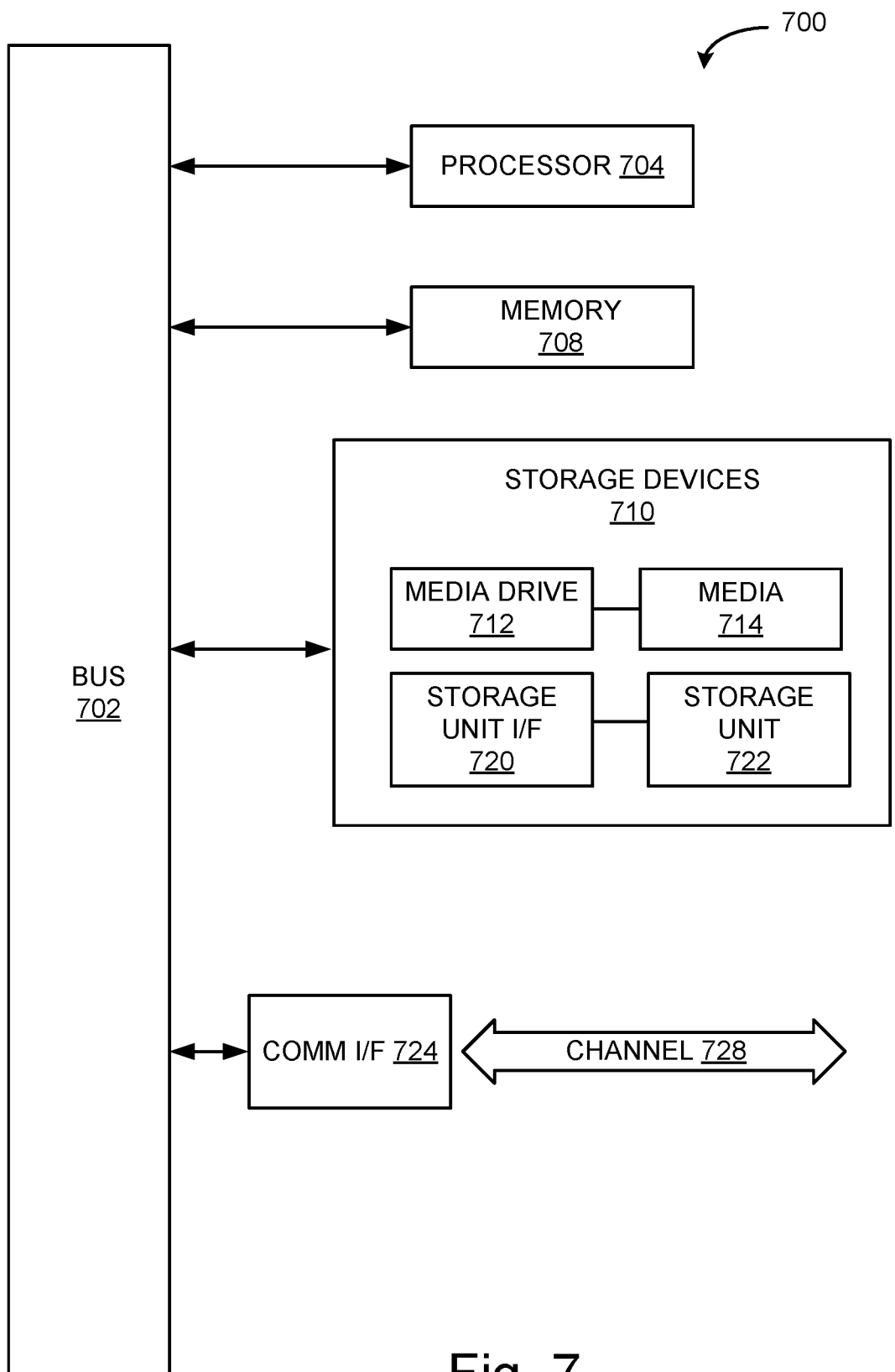
FIG. 7 is an example computing component that may be used to implement various features of embodiments described in the present disclosure.

As used herein, the term module may be used to describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. Various components described herein may be implemented as discrete module or described functions and features can be shared in part or in total among one or more modules. In other words, as would be apparent to one of ordinary skill in the art after reading this description, the various features and functionality described herein may be implemented in any given application. They can be implemented in one or more separate or shared modules in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where modules are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of metric map construction using a video sequence captured on a camera of a vehicle in an environment, comprising:
   receiving a video sequence from the camera, the video sequence comprising a plurality of image frames capturing a scene of the environment of the vehicle;
   using a neural camera model to predict a depth map and a ray surface for the plurality of image frames in the received video sequence; and
   constructing a metric map of the scene of the environment based on image data captured in the plurality of frames and depth information in the predicted depth map.

2. The method of claim 1, wherein predicting the depth map comprises performing the prediction under a constraint that predicted depths for corresponding pixels in the plurality of image frames are consistent across the plurality of image frames in the video sequence.

3. The method of claim 2, further comprising using the neural camera model to estimate ego motion between a first image frame and a second image frame to determine displacement relative to objects in the scene.

4. The method of claim 3, further comprising using the ego motion to transfer the depth information from the first image frame to the second image frame.

5. The method of claim 1, further comprising using the plurality of image frames to train the neural camera model at the same time the neural camera model is used to predict the depth map and the ray surface for the plurality of image frames.

6. The method of claim 1, further comprising using a neural camera model to predict a pose of the camera.

7. The method of claim 1, wherein using the neural camera model to predict the depth map and the ray surface for the plurality of image frames in the received video sequence comprises passing each frame of the video sequence through the neural camera model individually to train the neural camera model and to provide depth and ray surface predictions for each image.

8. The method of claim 1, wherein predicting the ray surfaces comprises performing the prediction under a constraint that predicted ray surfaces for corresponding pixels in the plurality of image frames are consistent across the plurality of image frames in the video sequence.

9. The method of claim 1, wherein the video sequence comprises a portion of an entire video file.

10. The method of claim 1, further comprising using the neural camera model to predict the depth map and the ray surface for the plurality of image frames for each of a plurality of different video sequences to train the neural camera model independently on each of the different video sequences.

11. The method of claim 1, wherein predicting is performed without a known or calibrated camera model for the camera.

12. The method of claim 1, wherein the neural camera model is configured to learn a pixel-wise ray surface that enables learning depth and pose estimates in a self-supervised way.

13. A system for metric map construction using a video sequence captured on a camera of a vehicle in an environment, the system comprising:
   a non-transitory memory configured to store instructions;
   a processor configured to execute the instructions to perform the operations of:
      receiving a video sequence from the camera, the video sequence including a plurality of image frames capturing a scene of the environment of the vehicle;
      using a neural camera model to predict a depth map and a ray surface for the plurality of image frames in the received video sequence; and
      constructing a metric map of the scene of the environment based on image data captured in the plurality of image frames and depth information in the predicted depth map.

14. The system of claim 13, wherein predicting the depth map comprises performing the prediction under a constraint that predicted depths for corresponding pixels in the plurality of image frames are consistent across the plurality of image frames in the video sequence.

15. The system of claim 14, wherein the operations further comprise using the neural camera model to estimate ego motion between a first image frame and a second image frame to determine displacement relative to objects in the scene.

16. The system of claim 15, wherein the operations further comprise using the ego motion to transfer the depth information from the first image frame to the second image frame.

17. The system of claim 13, wherein the operations further comprise using the plurality of image frames to train the neural camera model at the same time the neural camera model is used to predict the depth map and the ray surface for the plurality of image frames.

18. The system of claim 13, wherein the operations further comprise using a neural camera model to predict a pose of the camera.

19. The system of claim 13, wherein using the neural camera model to predict the depth map and the ray surface for the plurality of image frames in the received video sequence comprises passing each frame of the video sequence through the neural camera model individually to train the neural camera model and to provide depth and ray surface predictions for each image.

20. The system of claim 13, wherein predicting the ray surfaces comprises performing the prediction under a constraint that predicted ray surfaces for corresponding pixels in the plurality of image frames are consistent across the plurality of image frames in the video sequence.

21. The system of claim 13, wherein the video sequence comprises a portion of an entire video file.

22. The system of claim 13, wherein the operations further comprise using the neural camera model to predict the depth map and the ray surface for the plurality of image frames for each of a plurality of different video sequences to train the neural camera model independently on each of the different video sequences.

23. The system of claim 13, wherein predicting is performed without a known or calibrated camera model for the camera.

24. The system of claim 13, wherein the neural camera model is configured to learn a pixel-wise ray surface that enables learning depth and pose estimates in a self-supervised way.

* * * * *